(12) United States Patent
Chun

(10) Patent No.: US 6,520,114 B1
(45) Date of Patent: Feb. 18, 2003

(54) FOOD DISH FOR PETS

(76) Inventor: Ki Ho Chun, 3143 Dean Lake NE., Grand Rapids, MI (US) 49505

( * ) Notice: Subject to any disclaimer, the term of this patent is extended or adjusted under 35 U.S.C. 154(b) by 0 days.

(21) Appl. No.: 09/642,322

(22) Filed: Aug. 21, 2000

(51) Int. Cl.[7] .............................................. A01K 5/00
(52) U.S. Cl. ..................................................... 119/61
(58) Field of Search ................. 119/61, 51.5; D30/121, D30/129, 130, 131, 132, 133; 206/561, 564; 220/575, 506, 505, 503, 555

(56) References Cited

U.S. PATENT DOCUMENTS

| | | | |
|---|---|---|---|
| 948,014 A | 2/1910 | Lewis | |
| 1,552,076 A | 4/1925 | Mosier | |
| 1,624,941 A | 4/1927 | Fulkerson | |
| D105,812 S | 8/1937 | Siekert | |
| 2,191,811 A | 2/1940 | Trampier, Sr. | 119/51 |
| D122,576 S | 9/1940 | Steinhilber | |
| D127,799 S | 2/1941 | Hayt | |
| D127,800 S | 6/1941 | Hayt | |
| 2,543,465 A | 2/1951 | Morey | 119/51.5 |
| 2,584,301 A | 2/1952 | Sinclair | 119/61 |
| 2,677,350 A | 5/1954 | Prestidge et al. | 119/61 |
| D190,668 S | 6/1961 | Bliss | |
| 4,007,711 A | 2/1977 | Michael | 119/51.5 |
| 4,225,052 A | 9/1980 | Tector et al. | 220/22 |
| D262,069 S | 11/1981 | Khider | |
| D265,157 S | 6/1982 | McKeegan | |
| 4,357,905 A | 11/1982 | Carpenter | 119/61 |
| D269,386 S * | 6/1983 | Khider | D30/16 |
| 4,395,015 A * | 7/1983 | Reardon | 249/115 |
| D299,771 S * | 2/1989 | Kennedy | D30/130 |
| 4,896,627 A | 1/1990 | Riddell | 119/51.5 |
| 5,031,575 A * | 7/1991 | Phillips | 119/61 |
| 5,117,778 A | 6/1992 | Imamura | 119/51.5 |
| 5,253,609 A * | 10/1993 | Partelow et al. | 119/61 |
| D342,353 S | 12/1993 | Anatasi | 30/130 |
| D343,929 S | 2/1994 | Karapetian | 30/130 |
| 5,372,063 A * | 12/1994 | Berg | 100/110 |
| D373,448 S | 9/1996 | Chen | 30/130 |
| D373,449 S | 9/1996 | Chen | 30/130 |
| D373,858 S | 9/1996 | Chen | 30/130 |
| 5,632,228 A | 5/1997 | Ybarra | 119/51.5 |
| 5,743,210 A | 4/1998 | Lampe | 119/51.5 |
| 5,794,564 A | 8/1998 | Paro | 119/61 |
| 6,125,790 A * | 10/2000 | Breedwell | 119/51.5 |

* cited by examiner

*Primary Examiner*—Thomas Price
(74) *Attorney, Agent, or Firm*—Price, Heneveld, Cooper, DeWitt & Litton

(57) ABSTRACT

A pet food dish having three separate compartments, including a central compartment for holding food, an inner surround compartment and an outer surrounding compartment. The inner surrounding compartment, which surrounds the central compartment, catches food which a pet may inadvertently remove from the central compartment and promptly drop. The outer surrounding compartment, which surrounds the inner surrounding compartment, holds water to deter pests from getting to the pet food. The three compartments are separated by upstanding walls sufficiently high to minimize the accidental exchange of material between compartments by passage over the top of the separating compartment walls.

16 Claims, 2 Drawing Sheets

FOOD DISH FOR PETS

BACKGROUND OF THE INVENTION

The present invention relates to food dishes, and in particular to a food dish for pets.

Pet food dishes, in nearly all cases, are used for the feeding of pets such as dogs and cats. The dishes are typically placed on the floor adjacent to an external wall where they are especially accessible to crawling insects, such as ants, which have a propensity for seeking a supply of food. These insects will not only contaminate the pet food, but also cannot be tolerated in human habitats. Even if the insects cannot get into the dish, they will seek out food dropped by the pets from the food dish.

SUMMARY OF THE INVENTION

The present invention is a three compartment food dish comprising a central compartment and two successively surrounding compartments. Pet food is placed into the central compartment. The inner of the surrounding compartments catches food the pet may spill, and the outer compartment holds water, which prevents insects from getting into either spilled food in the inner compartment, surrounding compartment or the central compartment.

The food dish is efficient in use, economical to manufacture, capable of a long operable life, and particularly adapted for the proposed use. These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
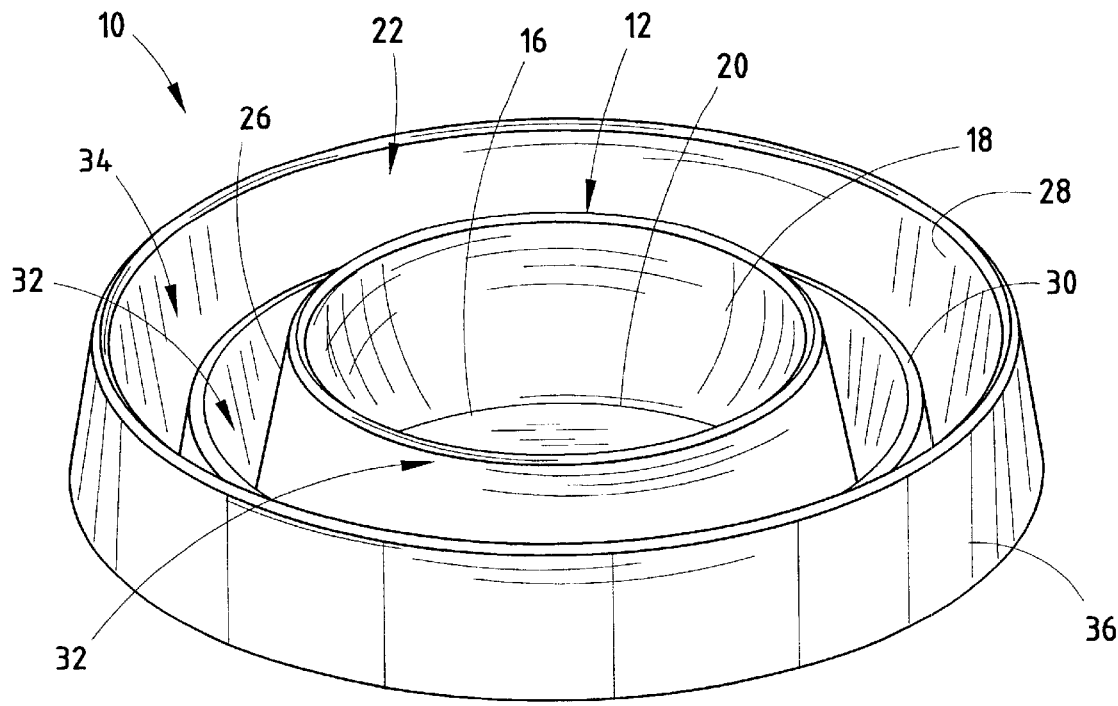
FIG. 1 is a perspective view of a food dish embodying the present invention.
Figure 2:
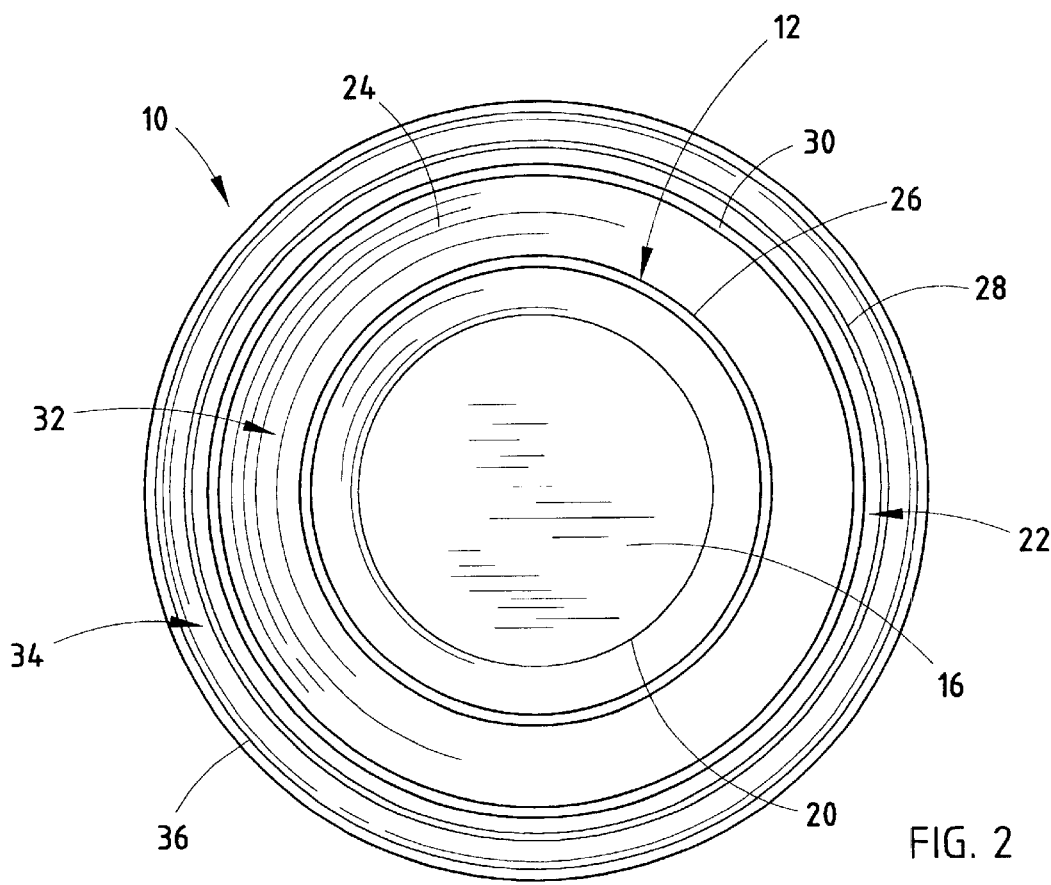
FIG. 2 is a top view of the food dish embodying the present invention.
Figure 3:
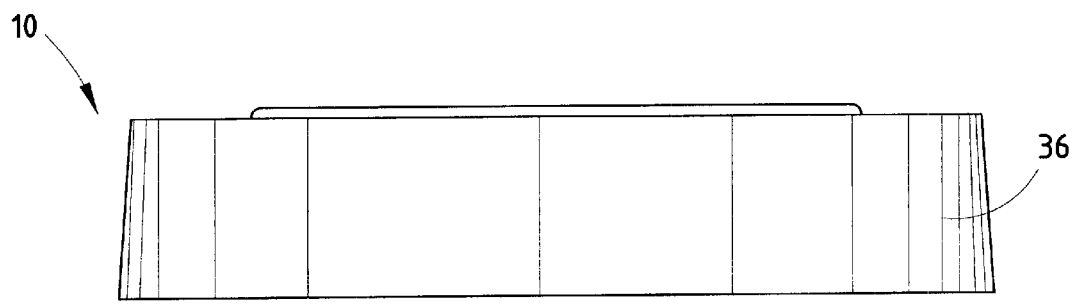
FIG. 3 is a side view of the food dish embodying the present invention.
Figure 4:
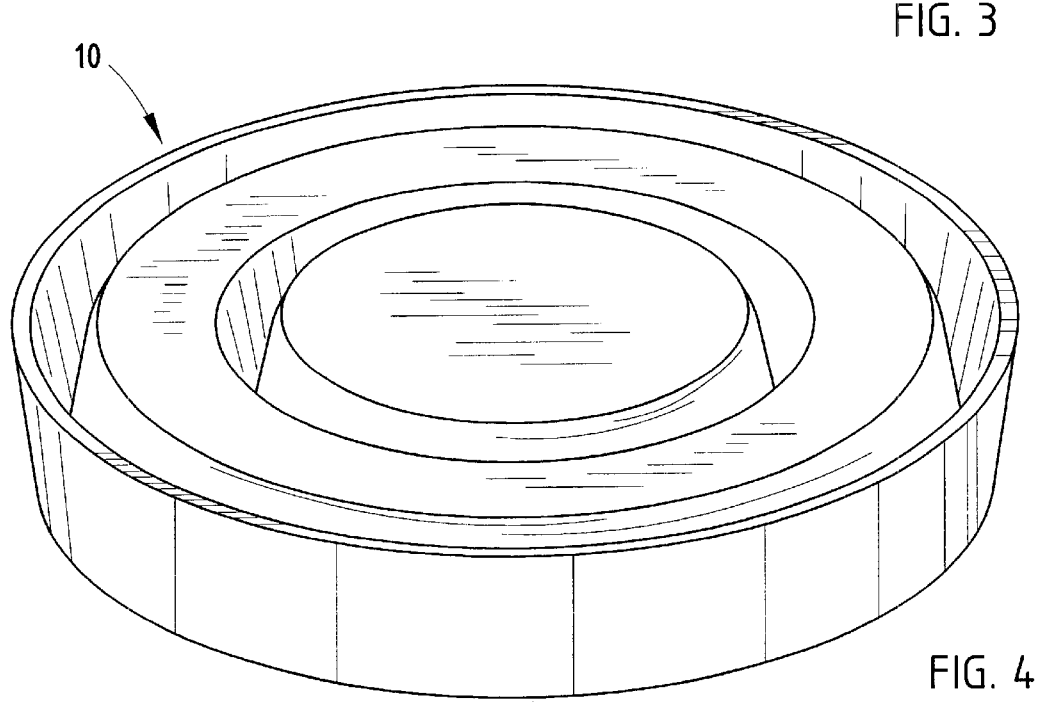
FIG. 4 is a bottom view of the food dish embodying the present invention.
Figure 5:
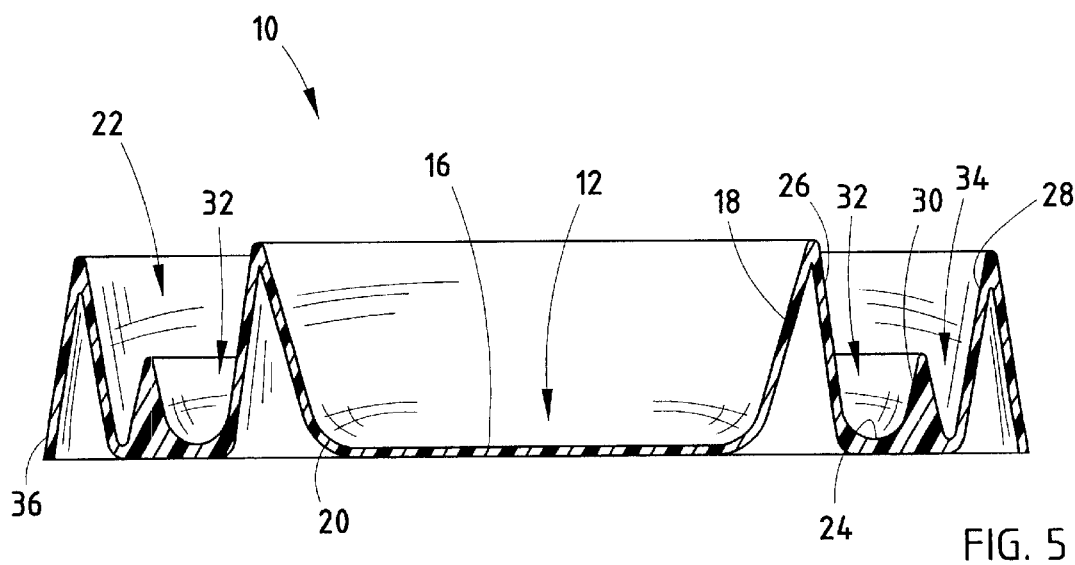
FIG. 5 is a cross-sectional side view of the food dish embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a food dish embodying the present invention. In the illustrated example, the food dish 10 includes an inner compartment in the shape of a concave hemispherical central bowl 12 adapted to hold food, the central bowl 12 including a bottom portion 16 and an upwardly sloping sidewall 18 integral with a periphery 20 of the bottom portion 16. The food dish 10 also includes a substantially concentric outer bowl 22 including a bottom floor 24, a first substantially vertical inner side wall 26 and an outer side wall 28, with the first substantially vertical inner side wall 26 integral with the upwardly sloping side wall 18 of the concave hemispherical central bowl 12. The substantially concentric outer bowl 22 includes a concentric rib 30 extending upward from the bottom floor 24, dividing the substantially concentric outer bowl 22 into an inner surrounding compartment 32 adjacent the concave hemispherical central bowl 12 and an outer surrounding compartment 34 distal the concave hemispherical central bowl 12. The concentric rib 30 of the substantially concentric outer bowl 22 has a height configured to retain water in the outer portion 34 of the substantially concentric outer bowl 22 between the outer side wall 28 and the concentric rib 30 and to keep the water in the outer portion 34 upon movement of the food dish 10 by a pet in order keep pests from the inner portion 32 of the substantially concentric outer bowl 22 and the concave hemispherical central bowl 12. Although the illustrated concave hemispherical central bowl 12 and the substantially concentric outer bowl 22 have a circular configuration, the concave hemispherical central bowl 12 and the substantially concentric outer bowl 22 can have a square, rectangular or any other configuration. As explained in more detail below, the substantially concentric outer bowl 22 is used to protect the food in the concave hemispherical central bowl 12 and to save food dropped from the concave hemispherical central bowl 12.

In the illustrated example, the food dish 10 also has a support wall 36 integral with and depending downward from the outer side wall 28 and the concentric rib 30 of the substantially concentric outer bowl 22 to a horizontal plane equal with the bottom floor 24. The support wall 36 steadies the concave hemispherical central bowl 12 and keeps the concave hemispherical central bowl 12 upright. The inner portion 32 of the substantially concentric outer bowl 22 of the illustrated food dish 10 preferably has a greater width than the width of the outer portion 34 of the substantially concentric outer bowl 22. The food dish 10 could also have a bottom plate (not shown) attached to or integral with the concave hemispherical central bowl 12, the bottom floor 24 of the substantially concentric outer bowl 22 and the support wall 36. It is contemplated that the food dish 10 could also have sand or other weights placed within the food dish 10 between the outer side wall 28 and the support wall 36 in order to steady the food dish 10 and to keep the food dish 10 upright. It is believed that the design of the food dish 10 as illustrated is unique.

The illustrated food dish 10 saves food dropped from the concave hemispherical central bowl of the food dish 10. The food dish 10 is used to feed pets by placing pet food in the concave hemispherical central bowl 12 of the food dish 10. The pets then eat the food by taking the food 14 out of the concave hemispherical central bowl 12 with their teeth. However, when the pet picks up food from the concave hemispherical central bowl 12 of the food dish 10, some of the food 14 drops directly outside of the concave hemispherical central bowl 12. When the food drops, the dropped food is captured within the inner portion 32 of the substantially concentric outer bowl 22 between the inner side wall 26 and the concentric rib 30 of the substantially concentric outer bowl 22. The larger width of the inner portion 32 of the substantially concentric outer bowl 22 facilitates the capture of the food within the inner portion 32. The food dish 10 therefore saves money by recovering food that would be lost. Furthermore, ants and other pests typically eat food dropped from prior art food dishes. Therefore, the food dish 10 also keeps ants and other pests away from the food dish 10 because the food will be trapped in the substantially concentric outer bowl 22 and the ants and other pests will not have access to the food.

The illustrated food dish 10 is also used to keep ants and other pests out of the food in the concave hemispherical central bowl 12 and the inner portion 32 of the substantially concentric outer bowl 22 by placing water 40 in the outer portion 34 of the substantially concentric outer bowl 22 between the outer side wall 28 and the concentric rib 30 of the substantially concentric outer bowl 22. Therefore, when the ants or other pests climb up and over the outer side wall 28 of the substantially concentric outer bowl 22, moving towards the concave hemispherical central bowl 12, they will get trapped in the water placed in the outer portion 34 of the substantially concentric outer bowl 22. The ants or other pests also will not be able to get to the food dropped in the inner portion 32 of the substantially concentric outer bowl 22.

In order to retain and keep the water in the outer portion 34 of the substantially concentric outer bowl 22, the height of the concentric rib 30 is preferably greater than half of the height of the first substantially vertical inner side wall 26 and the height of the outer side wall 28 of the substantially concentric outer bowl 22. Therefore, the water will be retained in the outer portion 34 of the substantially concentric outer bowl 22 upon large movements of the pet dish 10 by the pet. Furthermore, the height of the concentric rib 30 of the substantially concentric outer bowl 22 is preferably shorter than a height of the first substantially vertical inner side wall 26 and the height of the outer side wall 28 of the substantially concentric outer bowl 22 in order to have easy access to the food that falls into the inner portion 32 of the substantially concentric outer bowl 22.

The above description is considered that of the preferred embodiment only. Modification of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A pet food dish comprising:
three separate compartments, including a central compartment for holding food;
an inner surrounding compartment, which surrounds the central compartment, for catching food which a pet may inadvertently remove from the central compartment and promptly drop; and
an outer surrounding compartment, which surrounds the inner surrounding compartment, for holding water to deter pests from getting to the pet food;
the three compartments being separated by upstanding walls sufficiently high to minimize the accidental exchange of material between compartments by passage over the top of the separating compartment walls; and
a support wall integral with and depending downward from outer surrounding compartment to a horizontal plane equal with a bottom of the central compartment to steady the central compartment and to keep the central compartment upright.

2. The food dish of claim 1, wherein:
the inner surrounding compartment and the outer surrounding compartment each have a circular configuration.

3. The food dish of claim 2 wherein:
the inner surrounding compartment has a greater width than a width of the outer surrounding compartment.

4. The food dish of claim 1, wherein:
the outer surrounding compartment is uninterrupted whereby water placed in the outer surrounding compartment can uniformly fill the outer surrounding compartment.

5. A pet food dish comprising:
three separate compartments, including a central compartment for holding food;
an inner surrounding compartment, which surrounds the central compartment, for catching food which a pet may inadvertently remove from the central compartment and promptly drop; and
an outer surrounding compartment, which surrounds the inner surrounding compartment, for holding water to deter pests from getting to the pet food;
the three compartments being separated by upstanding walls sufficiently high to minimize the accidental exchange of material between compartments by passage over the top of the separating compartment walls; and
the height of the upstanding wall between the inner surrounding compartment and the outer surrounding compartment is shorter than a height of the upstanding wall between the central compartment and the inner surrounding compartment;
wherein the outer surrounding compartment includes an outer upstanding wall defining an outer periphery of the outer surrounding compartment, the height of the outer upstanding wall being greater than the height of the upstanding wall between the inner surrounding compartment and the outer surrounding compartment.

6. A pet food dish comprising:
three separate compartments, including a central compartment for holding food;
an inner surrounding compartment, which surrounds the central compartment, for catching food which a pet may inadvertently remove from the central compartment and promptly drop; and
an outer surrounding compartment, which surrounds the inner surrounding compartment, for holding water to deter pests from getting to the pet food;
the three compartments being separated by upstanding walls sufficiently high to minimize the accidental exchange of material between compartments by passage over the top of the separating compartment walls; and
the height of the upstanding wall between the inner surrounding compartment and the outer surrounding compartment is greater than half of the height of the upstanding wall between the central compartment and the inner surrounding compartment;
wherein the outer surrounding compartment includes an outer upstanding wall defining an outer periphery of the outer surrounding compartment, the height of the outer upstanding wall being greater than the height of the upstanding wall between the inner surrounding compartment and the outer surrounding compartment.

7. A method of keeping pests out of a food dish comprising:

providing a food dish having three separate compartments including a central compartment for holding food, an inner surrounding compartment surrounding the central compartment and an outer surrounding compartment surrounding the inner surrounding compartment; the three compartments being separated by upstanding walls sufficiently high to minimize the accidental exchange of material between compartments by passage over the top of the separating compartment walls; and placing water in the outer surrounding compartment to deter pests from getting to the pet food;

wherein the upstanding wall between the inner surrounding compartment and the outer surrounding compartment has a height configured to retain water in the outer surrounding compartment between the inner surrounding compartment and the outer surrounding compartment and keep the water in the outer surrounding compartment upon movement of the food dish by a pet in order keep pests from the inner surrounding compartment and the central compartment, further including the step of:

providing a support wall integral with and depending downward from outer surrounding compartment to a horizontal plane equal with a bottom of the central compartment to steady the central compartment and to keep the central compartment upright.

8. The method of keeping pests out of a food dish of claim 7, wherein:

the inner surrounding compartment and the outer surrounding compartment each have a circular configuration.

9. The method of keeping pests out of a food dish of claim 8, wherein:

the inner surrounding compartment has a greater width than a width of the outer surrounding compartment.

10. The method of keeping pests out of a food dish of claim 9, wherein:

the outer surrounding compartment is uninterrupted whereby the water placed in the outer surrounding compartment can uniformly fill the outer surrounding compartment.

11. The method of keeping pests out of a food dish of claim 7, wherein:

the height of the upstanding wall between the inner surrounding compartment and the outer surrounding compartment is shorter than a height of the upstanding wall between the central compartment and the inner surrounding compartment.

12. The method of keeping pests out of a food dish of claim 1, wherein:

the height of the upstanding wall between the inner surrounding compartment and the outer surrounding compartment is greater than half of the height of the upstanding wall between the central compartment and the inner surrounding compartment.

13. A method of saving food dropped from a food dish comprising:

providing a food dish having three separate compartments including a central compartment for holding food, an inner surrounding compartment surrounding the central compartment and an outer surrounding compartment surrounding the inner surrounding compartment; the three compartments being separated by upstanding walls sufficiently high to minimize the accidental exchange of material between compartments by passage over the top of the separating compartment walls; and providing food in the central compartment;

taking a portion of the food out of the central compartment;

dropping at least some of the food during the step of taking a portion of the food out of the central compartment; and capturing the at least some of the food dropped in the outer surrounding compartment;

the height of the upstanding wall between the inner surrounding compartment and the outer surrounding compartment is shorter than a height of the upstanding wall between the central compartment and the inner surrounding compartment.

14. The method of saving food dropped from a food dish of claim 13, further including the step of:

providing a support wall integral with and depending downward from outer surrounding compartment to a horizontal plane equal with a bottom of the central compartment to steady the central compartment and to keep the central compartment upright.

15. The method of saving food dropped from a food dish of claim 14, wherein:

the inner surrounding compartment and the outer surrounding compartment each have a circular configuration.

16. The method of saving food dropped from a food dish of claim 15, wherein:

the inner surrounding compartment has a greater width than a width of the outer surrounding compartment.

* * * * *